Figure 1:
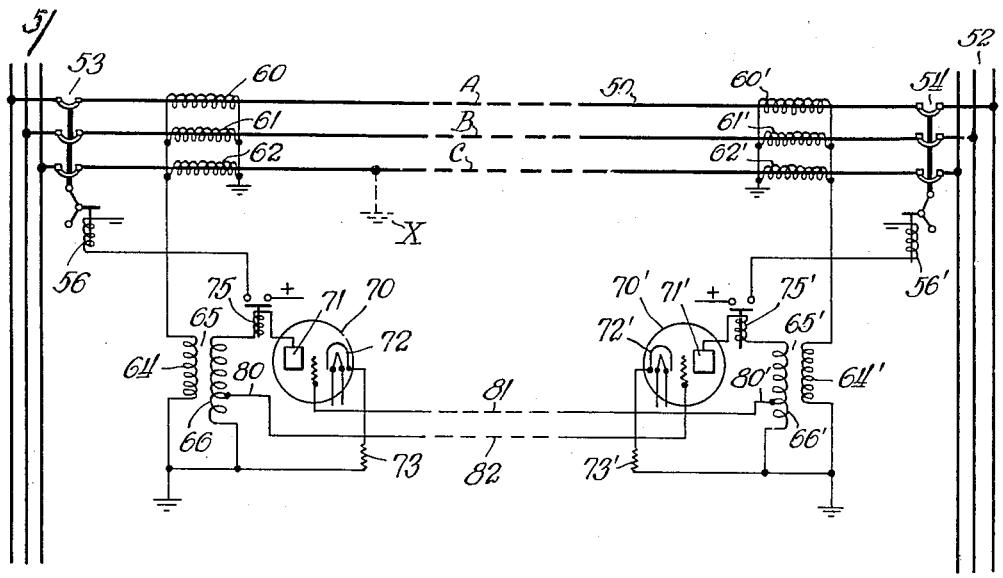

Sept. 3, 1940.    R. I. WARD    2,213,294
DIFFERENTIAL PROTECTION MEANS

Original Filed Feb. 10, 1936

Inventor:
Robert I. Ward.
By Brown Jackson Boettcher & Dienner
Attys.

Patented Sept. 3, 1940

2,213,294

UNITED STATES PATENT OFFICE 2,213,294

DIFFERENTIAL PROTECTION MEANS

Robert I. Ward, Itasca, Ill.

Original application February 10, 1936, Serial No. 63,135, now Patent No. 2,147,781, dated February 21, 1939. Divided and this application December 24, 1938, Serial No. 247,712

17 Claims. (Cl. 175—294)

This invention relates to means for detecting and protecting against certain types of faults to which alternating current systems are subject, such as short circuits, grounds or other faults which produce unbalanced conditions in distribution lines or the like.

This application is a division of my copending application Serial No. 63,135, now issued as Patent No. 2,147,781, granted February 21, 1939, filed February 10, 1936, as a continuation-in-part of my then copending application Serial No. 573,754, filed November 9, 1931, now issued as Patent No. 2,047,343, granted July 14, 1936. The present invention is directed particularly to the protection of lines against transformer faults or unbalanced conditions therein, and to the differential protection of sections of alternating current systems.

For this type of protection, the present alternating current distribution systems require apparatus that must be highly sensitive to unbalanced conditions and the like, being directional at approximately one percent normal voltage and operable in a fraction of a second under overload. There is considerable difficulty in designing apparatus capable of this sensitivity and maintaining it operable at such sensitivity at all times.

I have devised a relay arrangement wherein the sensitive element comprises a high vacuum tube, providing a degree of sensitivity combined with reliability hitherto unknown. I prefer to connect the grid and plate circuits of the tube in such manner that the grid prevents any substantial or operative current flow in the plate circuit under normal conditions, and permits operative plate current flow upon occurrence of a fault or unbalanced condition.

It is one of the objects of the present invention to provide a control relay in the form of a three element vacuum tube wherein a certain alternating voltage is applied to the grid, a certain alternating voltage is applied to the plate, and the plate circuit serves as an indication of the variations in the relative phase angle between the plate and grid voltages. The two voltages may be functions of the currents flowing in different parts of the system whereby the relay may be used for differential line protection, or for protection against faults which result in a relative phase change of the currents in different parts of the system.

The attainment of the above and further objects of the present invention will be more apparent from the following detailed description which, taken in conjunction with the accompanying drawing, will disclose to those skilled in the art the particular construction and operation of preferred forms of the present invention.

Figure 2:
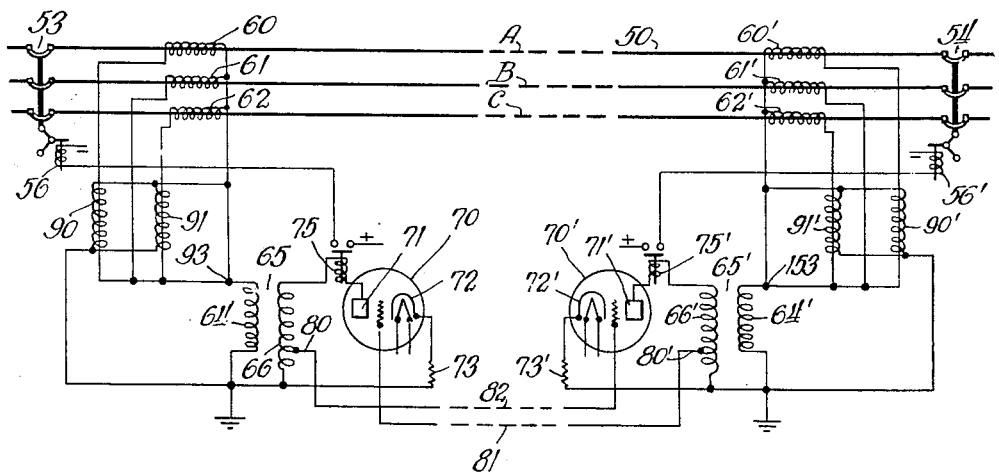

In the drawing:

Figure 1 is a circuit diagram illustrating a pilot wire protecting arrangement embodying the principles of my invention; and Figure 2 is a modification of the system shown in Figure 1.

Reference may now be had more particularly to Figure 1, wherein I have shown my invention applied to a section of a three phase power line for isolating the section upon the occurrence of a fault therein. The section to which the protection is applied is indicated at 50, and forms a connecting link between the two parts of the system indicated as a power line 51 and a power line 52. Circuit breakers 53 and 54 at the two ends of the section 50 connect this section with the rest of the system. The apparatus at the left hand end of the section 50 comprises three current transformers 60, 61 and 62, one for each phase of the system. The secondaries of the three current transformers are connected in parallel with one another and in parallel with the primary 64 of a special pilot transformer 65. When the load carried by the three conductors of the section 50 is balanced, no current will flow through the primary 64 of the transformer 65. The secondary 66 of the transformer 65 is connected to supply voltage to the plate of a high vacuum tube 70 of a construction similar to that of the tube previously described. The plate is indicated at 71, the cathode at 72, the cathode being grounded through a suitable resistance 73. A relay 75 is connected in the plate circuit of the tube 70, the relay controlling the tripping of the circuit breaker 53 through the trip coil 56.

At the right end of the section 50 there is provided a set of apparatus similar to that at the left hand end of the section, and similar reference numerals have been used to indicate similar parts of the two ends of the section, the reference numerals for the part at the right end of the section being primed. The secondary of the transformer 65 is provided with a tap 80 which supplies voltage to the grid of the tube 70'. A similar tap 80' on the secondary of transformer 65' supplies voltage to the grid of the tube 70. For this purpose two pilot wires 81 and 82 are provided.

Under normal operation when there is a balanced load upon the three conductors A, B, and C of the section 50, no current flows through the primaries of the transformers 65 and 65', and hence there is no voltage upon the plate or the grid of the tube. The tripping relays 75 and 75' therefore remain unenergized. Under certain fault conditions current does flow through the primaries 64 and 64' resulting in an operation of the relay system to isolate the section of the line.

An explanation will now be given on the operation of this system upon the occurrence of fault at various places in the system and under various conditions. Assume that a ground fault occurs on the C phase conductor at the point marked X. Assume further that power is being sent to the fault from both the line 51 and the line 52. The unbalanced current in the current transformers 60, 61 and 62 will flow through the primary of the transformer 65 and will induce a voltage in the secondary thereof, thus placing an alternating voltage upon the plate 71 of the tube 70, and, through the conductor 82, placing an alternating voltage upon the grid of the tube 70'. At the same time power is being fed to the fault from the line 52 thereby producing a similar condition in the apparatus at the right hand end of the section 50 whereby an alternating voltage is impressed on the plate of the tube 70' and, through the pilot conductor 81, upon the grid of the tube 70 through ground. Since the lines 51 and 52 are interconnected as part of a network, the voltages on these two lines will be in phase with one another, hence the current through the primaries 64 and 64' will be in phase with one another. From this it follows that the voltage on the grid of the tube 70 as supplied by the secondary 66' of the transformer 65' will be substantially in phase with the voltage on the plate 71 as supplied by the secondary of the transformer 65. A similar phase relationship exists between the voltage on the grid and plate of the tube 70'. The grids will therefore permit current to flow through the respective plate circuits and bring about the energization of the relays 75 and 75' which, upon closing, complete the circuits through the trip coils 56 and 56' for tripping the circuit breakers 53 and 54.

If power were being fed to the ground fault from only one end of the line the operation would be similar to that as above set forth. Assume that the line 51 is the power line and the line 52 extends to a load and is not connected to any other source of power. Fault current through the C phase conductor will result in a current flow through the primary 64 of transformer 65 in the same manner as has been previously set forth, with the result that alternating potential is applied to the plate of the tube 70 and to the grid of the tube 70'. If there is a load on the line 52, the load impedance may prevent any substantial return current flow from the A and B phases through the load to the C phase. Since the grid of the tube 70 is practically at zero potential, plate current is permitted to flow and the relay 75 is energized to trip the circuit breaker 53. If the line 52 is later energized and the fault still remains on the C phase, the circuit breaker 54 will be tripped as a result of a similar sequence of operations.

If, at the time of occurrence of the fault at the point marked X there is no load upon the conductors 52, or if the equivalent results from the fact that the circuit breaker 54 happens to be opened at the time, the operation of the system will not be adversely affected. Under such conditions there is an alternating voltage impressed upon the plate of the tube 70 and an alternating voltage impressed upon the grid of the tube 70'. There is no voltage upon the grid of the tube 70 and there is no voltage upon the plate of the tube 70'. The tube 70' therefore does not produce an operation of the relay 75'. On the other hand plate current does flow through the plate circuit of the tube 70, notwithstanding the absence of the grid potential due to the fact that the tube here employed is so designed that it is not necessary to have a grid voltage in order to initiate current flow in the cathode-plate circuit. The grid is effective only to prevent the plate current flow when the grid is at a negative potential. The relay 75 operates and brings about a tripping of the circuit breaker 53. Under such conditions it is apparent that circuit breaker 54, if it is not already open, need not be tripped if there is no load upon the line 52 and is not connected to a source of power, it is immaterial whether or not the circuit breaker 54 is open or closed.

It is to be noted that current will flow through the plate circuit of the tube when there is plate voltage and there is no impediment from the grid. Thus if the grid voltage is in phase with the plate voltage, there will be a plate current flow during each half cycle that the plate voltage is positive. The same condition will prevail when there is no voltage on the grid. However, if the grid and the plate are substantially 180 degrees out of phase, then the grid will prevent plate current flow. It is to be noted that the current transformers at the two ends of the section 50 are oppositely connected so that when the current is flowing in the same direction at the two ends of the section the unbalanced current, if any, in the primaries of the transformers 65, 65' will be in opposite directions whereas if the directions of flow at the two ends of the section are in opposition, then the resulting current in the primaries of the transformer 65, 65' will be in the same direction.

When a fault occurs externally of the section 50 but so related to the section that the unbalanced fault current flows therethrough it is not necessary, nor desirable, to open the circuit breakers 53—54 since the fault, being external of the section under consideration, should be cleared by the protective apparatus provided at the fault, thus permitting as much of the system as possible to remain in service. To show that the circuit breakers 53—54 are not tripped under such circumstances let us assume that a ground fault occurs on one of the phase conductors of the line 52 and is supplied with power from the line 51 by way of the section 50. Assume that the fault is on the C-phase conductor. An unbalanced current will flow through the section 50, the instantaneous direction of flow being the same at the two ends of the section. A large current will flow through the current transformer 62 to ground by way of the primary 64 and a similar current will flow through the transformer 62' to ground by way of the primary of the transformer 65'. It is to be noted that the secondaries of the two current transformers are oppositely connected with respect to the primaries of the associated pilot transformers 65 and 65'. Therefore the current flowing through the primaries of the transformers 65 and 65' will be approximately 180 degrees out of phase. Since each of the two tubes 70 and 70' is supplied with plate voltage from one of the pilot transformers and grid voltage from the other pilot transformer it follows that the plate and grid voltages of the two tubes will be substantially 180 degrees out of phase and hence the grids will prevent the flow of current through the respective plate circuits. Therefore the relays 75 and 75' will not operate and the circuit breakers will not be tripped.

Referring now to Figure 2, wherein I show my invention as applied to a somewhat different protective arrangement, this system is identical to that shown in Figure 2 except for the fact that two additional transformers 90 and 91 are provided at one end of the section and two current transformers 90' and 91' are provided at the other end of the section. The circuit shown in Figure 2 is adapted to be connected in a system such as is shown in Figure 1. The current transformer 90 is of a ratio different from that of the current transformer 91. By way of illustration, the transformer 90 may have a two-to-one ratio and the transformer 91 a four-to-one ratio. It may be shown that a voltage will be present between the points 93 and ground through winding 64 and windings 90 and 91 upon the occurrence of an overload upon any one, two or all three of the conductors of the line 50 of Figure 2. This is true whether the overload is brought about by a phase to ground fault, a two phase fault, or a three phase fault, even though the three phase fault results in a balanced current flow through the three phase conductors of the line 50. A further description as to why this takes place is to be found in the patent to Le Clair and Gross, No. 1,919,231, of July 25, 1933. This voltage will cause a current flow through the primary winding 64 of the transformer 65 with the result that a voltage will be induced in the secondary winding 66 of this transformer. A similar action takes place at the other end of the section 50. The action of the two tubes in the system shown in Figure 2 will be identical to that of the tubes shown in the system of Figure 1. When the voltages on the secondaries of the transformers 65 and 65' are in phase, the grids of the respective tubes will permit a current flow whereas, when the voltages are 180 degrees out of phase, the grids will prevent a plate current flow. It is to be noted that when the overload current is in the same direction at the two ends of the section 50, indicating that the fault is external of the section, the voltages of the secondaries of the transformers 65 and 65' will be in opposition, whereby no current flows through the plate circuit, whereas, when the currents flow in the same relative directions at the two ends of the line, indicating a fault between the two ends of the line, the voltages at the secondaries of the transformers 65 and 65' will be in phase whereby the grids permit a plate current flow.

In either of the embodiments of the invention shown or described, a hot cathode tube of either the mercury vapor or high vacuum type may be employed.

While various modifications and changes may be made within the disclosure of the present invention, the invention is not to be limited to the exact circuit shown and described, but only in so far as defined by the scope and spirit of the appended claims.

I claim:

1. Means for disconnecting a section of an alternating current power system from the rest of the system responsive to the occurrence of a fault in the section comprising means at each end of the section for measuring the unbalanced current, and at one end of the section a hot cathode tube including a grid element and a plate element, means for applying to one of the elements a voltage that varies as a function of the unbalanced current at one end of the section, means for applying to the other element a voltage which varies as a function of the unbalanced current at the other end of the section, said grid element preventing the initiation of operative plate current flow when the voltage of the grid is opposite to that of the plate, but permitting operative plate current flow when both the grid and plate elements are at a positive potential whereby the plate current is a function of the phase displacement of the unbalanced current at the two ends of the section, and means controlled by the plate circuit for disconnecting the section of the line from the rest of the system.

2. Means for disconnecting a section of an alternating current power system from the energized portion thereof on the occurrence of a fault in the section comprising, in combination, means at each end of the section for measuring the fault current, a tube including a plate element, a grid element and a cathode, means for applying to one of said elements a voltage that varies as a function of the fault current at one end of the section, means for applying to the other element a voltage which varies as a function of the fault current at the other end of the section, and means responsive to flow of current through said tube flow of current resulting from a fault in the section for disconnecting the same from the energized portion of the system.

3. Means for disconnecting a section of an alternating current power system from the energized portion thereof on the occurrence of a fault in the section comprising, in combination, means at each end of the section for measuring the fault current, a tube including a plate element, a grid element and a cathode at each end of said section, means for applying to one of said elements of one tube a voltage that varies as a function of the fault current at one end of the section and to the other of said elements of said one tube a voltage that varies as a function of the fault current at the other end of said section, means for applying to one of said elements of the other tube a voltage that varies as a function of the fault current at said other end of the section and to the other of said elements of said other tube a voltage that varies as a function of the fault current at said one end of the section, and means responsive to flow of current through said tubes on flow of current resulting from a fault in the section for disconnecting the same from the energized portion of the system.

4. Means for disconnecting a section of an alternating current power system from the energized portion thereof on the occurrence of a fault in the section comprising, in combination, means at each end of the section for measuring the fault current, a tube including a plate element, a grid element and a cathode at each end of said section, means for applying to one of said elements of one tube a voltage that varies as a function of the fault current at one end of the section and to the other of said elements of said one tube a voltage that varies as a function of the fault current at the other end of said section, means for applying to one of said elements of the other tube a voltage that varies as a function of the fault current at said other end of the section and to the other of said elements of said other tube a voltage that varies as a function of the fault current at said one end of the section, a circuit breaker at each end of the section for controlling the connection of the same to the system, each tube being individual to a circuit breaker, and means individual to each tube and responsive to current flow therethrough resulting from flow of current caused by a fault in the section for operating the circuit breaker individual thereto.

5. Means for disconnecting a section of an alternating current power system from the energized portion thereof on the occurrence of a fault in the section comprising, in combination, means at each end of the section for measuring the fault current, a transformer at each end of the section having a primary winding connected to the fault current measuring means thereat and a secondary winding, a tube including a plate element, a grid element and a cathode, circuit means connecting the secondary winding of one transformer to one of said elements and connecting the secondary winding of the other transformer to the other of said elements, and means responsive to flow of current through said tube on flow of current resulting from a fault in the section for disconnecting the same from the energized portion of the system.

6. Means for disconnecting a section of an alternating current power system from the energized portion thereof on the occurrence of a fault in the section comprising, in combination, means at each end of the section for measuring the fault current, a transformer at each end of the section having a primary winding connected to the fault current measuring means thereat and a secondary winding, a tube including a plate element, a grid element and a cathode at each end of the section, circuit means connecting one of said elements of one tube to the secondary winding of one transformer and the other of said elements of said one tube to the secondary winding of the other transformer, circuit means connecting one of said elements of the other tube to said secondary winding of said other transformer and the other of said elements of said other tube to said secondary winding of said one transformer, and means responsive to flow of current through said tubes on flow of current resulting from a fault in the section for disconnecting the same from the energized portion of the system.

7. Means for disconnecting a section of an alternating current power system from the energized portion thereof on the occurrence of a fault in the section comprising, in combination, means at each end of the section for measuring the fault current, a transformer at each end of the section having a primary winding connected to the fault current measuring means thereat and a secondary winding, a tube including a plate element, a grid element and a cathode at each end of the section, circuit means connecting one of said elements of one tube to the secondary winding of one transformer and the other of said elements of said one tube to the secondary winding of the other transformer, circuit means connecting one of said elements of the other tube to said secondary winding of said other transformer and the other of said elements of said other tube to said secondary winding of said one transformer, a circuit breaker at each end of the section for controlling the connection of the same to the system, each tube being individual to a circuit breaker, and means individual to each tube and responsive to current flow therethrough resulting from flow of current caused by a fault in the section for operating the circuit breaker individual thereto.

8. Means for disconnecting a section of an alternating current polyphase power system from the energized portion thereof on the occurrence of a fault in the section comprising, in combination, means at each end of the section for measuring the unbalanced current, a transformer at each end of the section having a primary winding connected to the unbalanced current measuring means thereat and a secondary winding, a tube including a plate element, a grid element and a cathode at one end of the section, circuit means connecting the secondary winding of one transformer to one of said elements and connecting the secondary winding of the other transformer to the other of said elements, and means responsive to flow of current through said tube on flow of unbalanced fault current in the section for disconnecting the same from the energized portion of the system.

9. Means for disconnecting a section of an alternating current polyphase power system from the energized portion thereof on the occurrence of a fault in the section comprising, in combination, means at each end of the section for measuring the unbalanced current, a transformer at each end of the section having a primary winding connected to the unbalanced current measuring means thereat and a secondary winding, a tube including a plate element, a grid element and a cathode at each end of the section, circuit means connecting one of said elements of one tube to the secondary winding of one transformer and the other of said elements of said one tube to the secondary winding of the other transformer, circuit means connecting one of said elements of the other tube to said secondary winding of said other transformer and the other of said elements of said other tube to said secondary winding of said one transformer, and means responsive to flow of current through said tubes on flow of unbalanced fault current in the section for disconnecting the same from the energized portion of the system.

10. Means for disconnecting a section of an alternating current polyphase power system from the energized portion thereof on the occurrence of a fault in the section comprising, in combination, means at each end of the section for measuring the unbalanced current, a transformer at each end of the section having a primary winding connected to the unbalanced current measuring means thereat and a secondary winding, a tube including a plate element, a grid element and a cathode at each end of the section, circuit means connecting one of said elements of one tube to the secondary winding of one transformer and the other of said elements of said one tube to the secondary winding of the other transformer, circuit means connecting one of said elements of the other tube to said secondary winding of said other transformer and the other of said elements of said other tube to said secondary winding of said one transformer, a circuit breaker at each end of the section for controlling the connection of the same to the system, each tube being individual to a circuit breaker, and means individual to each tube and responsive to unbalanced fault current in the section for operating the circuit breaker individual thereto.

11. Apparatus for disconnecting a section of an alternating current polyphase line from the rest of the system comprising, means for producing an alternating voltage which is a function of a balanced current at the end of the section plus a function of the unbalanced current at the end of the section, similar means at the other end of the section, a hot cathode tube including a plate element and a grid element, means impressing the voltage of one of said means on the plate element and the voltage of the other of said means on the grid element, the grid voltage preventing operative plate current flow when the grid-plate voltages are in certain phase relationship but permitting operative plate current flow in certain other phase relationship, and means controlled in accordance with operative plate current flow for controlling the disconnection of the section from the rest of the system.

12. Apparatus for disconnecting a section of an alternating current polyphase system from the energized portion thereof comprising, in combination, means at each end of the section for producing an alternating voltage which is a function of a balanced current plus a function of the unbalanced current at that end of the section, a tube including a plate element, a grid element and a cathode, means impressing the voltage of one of said means on said plate element and the voltage of the other of said means on said grid element, and means responsive to flow of current through said tube on flow of current resulting from a fault in the section for disconnecting the same from the energized portion of the system.

13. Apparatus for disconnecting a section of an alternating current polyphase system from the energized portion thereof comprising, in combination, means at each end of the section for producing an alternating voltage which is a function of a balanced current plus a function of the unbalanced current at that end of the section, a tube individual to each end of said section including a plate element, a grid element and a cathode, means impressing the voltage of one of said means on the plate element of one of said tubes and on the grid element of the other of said tubes, means impressing the voltage of the other of said means on the grid element of said one tube and on the plate element of said other tube, and means responsive to flow of current through said tubes on flow of current resulting from a fault in the section for disconnecting the same from the energized portion of the system.

14. Apparatus for disconnecting a section of an alternating current polyphase system from the energized portion thereof comprising, in combination, means at each end of the section for producing an alternating voltage which is a function of a balanced current plus a function of the unbalanced current at that end of the section, a tube individual to each end of said section including a plate element, a grid element and a cathode, means impressing the voltage of one of said means on the plate element of one of said tubes and on the grid element of the other of said tubes, means impressing the voltage of the other of said means on the grid element of said one tube and on the plate element of said other tube, a circuit breaker at each end of the section for controlling the connection of the same to the system, each tube being individual to a circuit breaker, and means individual to each tube and responsive to current flow therethrough resulting from flow of current caused by a fault in the section for operating the circuit breaker individual thereto.

15. Apparatus for disconnecting a section of an alternating current polyphase system from the energized portion thereof comprising, in combination, means at each end of the section for producing an alternating voltage which is a function of a balanced current plus a function of the unbalanced current at that end of the section, a transformer at each end of the section having a primary winding on which the voltage of said means thereat is impressed and a secondary winding, a tube including a plate element, a grid element and a cathode, circuit means connecting the secondary winding of one transformer to one of said elements and connecting the secondary winding of the other transformer to the other of said elements, and means responsive to flow of current through said tube on flow of current resulting from a fault in the section for disconnecting the same from the energized portion of the system.

16. Apparatus for disconnecting a section of an alternating current polyphase system from the energized portion thereof comprising, in combination, means at each end of the section for producing an alternating voltage which is a function of a balanced current plus a function of the unbalanced current at that end of the section, a transformer at each end of the section having a primary winding on which the voltage of said means thereat is impressed and a secondary winding, a tube individual to each end of said section including a plate element, a grid element and a cathode, circuit means connecting one of said elements of one tube to the secondary winding of one transformer and the other of said elements of said one tube, to the secondary winding of the other transformer, circuit means connecting one of said elements of the other tube to said secondary winding of said other transformer and the other of said elements of said other tube to said secondary winding of said one transformer, and means responsive to flow of current through said tubes on flow of current resulting from a fault in the section for disconnecting the same from the energized portion of the system.

17. Apparatus for disconnecting a section of an alternating current polyphase system from the energized portion thereof comprising, in combination, means at each end of the section for producing an alternating voltage which is a function of a balanced current plus a function of the unbalanced current at that end of the section, a transformer at each end of the section having a primary winding on which the voltage of said means thereat is impressed and a secondary winding, a tube individual to each end of said section including a plate element, a grid element and a cathode, circuit means connecting one of said elements of one tube to the secondary winding of one transformer and the other of said elements of said one tube to the secondary winding of the other transformer, circuit means connecting one of said elements of the other tube to said secondary winding of said other transformer and the other of said elements of said other tube to said secondary winding of said one transformer, a circuit breaker at each end of the section for controlling the connection of the same to the system, each tube being individual to a circuit breaker, and means individual to each tube and responsive to current flow therethrough resulting from flow of current caused by a fault in the section for operating the circuit breaker individual thereto.

ROBERT I. WARD.